United States Patent
Kleman et al.

(10) Patent No.: US 9,291,443 B2
(45) Date of Patent: Mar. 22, 2016

(54) FMCW RADAR LEVEL GAUGE WITH LOCK STATE CONTROL

(71) Applicant: Rosemount Tank Radar AB, Gothenburg (SE)

(72) Inventors: Mikael Kleman, Vreta Kloster (SE); Anders Jirskog, Huskvarna (SE)

(73) Assignee: Rosemount Tank Radar AB, Gothenburg (SE)

( * ) Notice: Subject to any disclaimer, the term of this patent is extended or adjusted under 35 U.S.C. 154(b) by 138 days.

(21) Appl. No.: 13/788,700

(22) Filed: Mar. 7, 2013

(65) Prior Publication Data

US 2014/0253147 A1    Sep. 11, 2014

(51) Int. Cl.
| | | |
|---|---|---|
| G01S 13/08 | (2006.01) | |
| H03L 7/00 | (2006.01) | |
| G01B 7/26 | (2006.01) | |
| G01B 15/00 | (2006.01) | |
| G01F 23/284 | (2006.01) | |
| G01S 7/35 | (2006.01) | |
| G01S 13/34 | (2006.01) | |
| G01S 13/88 | (2006.01) | |

(52) U.S. Cl.
CPC *G01B 7/26* (2013.01); *G01B 15/00* (2013.01); *G01F 23/284* (2013.01); *G01S 7/35* (2013.01); *G01S 13/347* (2013.01); *G01S 13/88* (2013.01)

(58) Field of Classification Search
CPC .................. G01R 27/2605; G01R 31/31709; G01R 19/0092; G01R 15/18; G01R 15/181; G01R 15/183; G01S 13/06; G01S 2013/9375; G01F 23/00; G01F 25/0061; G01F 23/0061; G01F 23/26; G01F 23/263; G01F 23/0076

USPC ............. 324/644, 118, 76.53, 683, 124, 127, 324/129, 133, 134, 635, 663, 671, 669, 324/716; 342/118, 124, 127, 129, 133, 134; 73/1.31, 1.73, 1.81, 1.79, 760, 763, 73/767, 290 R

See application file for complete search history.

(56) References Cited

U.S. PATENT DOCUMENTS

| | | | |
|---|---|---|---|
| 5,866,582 A | | 2/1999 | Duvert |
| 6,107,957 A | * | 8/2000 | Cramer ................ G01F 23/284 342/124 |
| 6,265,947 B1 | | 7/2001 | Klemmer et al. ............... 331/17 |

(Continued)

FOREIGN PATENT DOCUMENTS

| | | |
|---|---|---|
| EP | 2166671 A2 | 3/2010 |
| WO | 2004005960 A1 | 1/2004 |
| WO | 2008136752 A1 | 11/2008 |

OTHER PUBLICATIONS

International Search Report and Written Opinion of International Application No. PCT/EP2014/054218 dated May 30, 2014 (11 pages).

*Primary Examiner* — Melissa Koval
*Assistant Examiner* — Taqi Nasir
(74) *Attorney, Agent, or Firm* — Westman, Champlin & Koehler, P.A.

(57) ABSTRACT

The present invention relates to a radar level gauge system comprising PLL circuitry for generating an output signal. The PLL circuitry is configured to indicate a lock state of the PLL circuitry; and signal modifying circuitry is connected to the PLL circuitry for receiving the output signal and for modifying at least one property of the output signal for forming the transmit signal. The signal modifying circuitry is arranged and configured to receive a PLL status signal indicative of the lock state of the PLL circuitry, and to modify the at least one property of the output signal in response to the PLL status signal indicating that the PLL circuitry is in a locked state.

21 Claims, 5 Drawing Sheets

(56) References Cited

U.S. PATENT DOCUMENTS

| | | | |
|---|---|---|---|
| 2010/0066589 A1* | 3/2010 | Sai | G01F 23/284 342/124 |
| 2011/0102243 A1 | 5/2011 | Sai et al. | |
| 2011/0163910 A1 | 7/2011 | Sai | 342/124 |
| 2012/0299767 A1 | 11/2012 | Kleman | 342/124 |

* cited by examiner

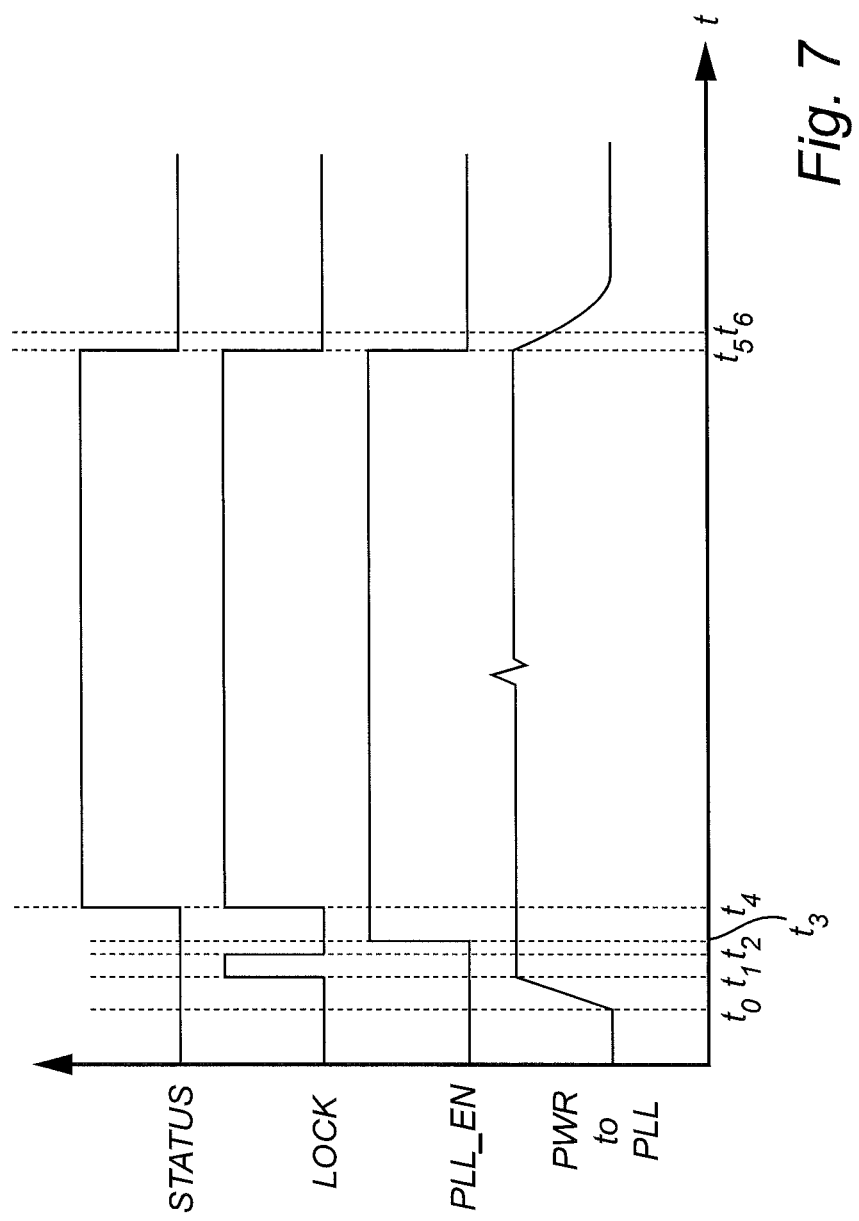

US 9,291,443 B2

FMCW RADAR LEVEL GAUGE WITH LOCK STATE CONTROL

FIELD OF THE INVENTION

The present invention relates to a radar level gauge system and to a method of determining a filling level using a radar level gauge system.

TECHNICAL BACKGROUND

Since the radar level gauging was developed as a commercial product in the 1970's and 1980's, frequency modulated continuous wave (FMCW) has been the dominating measuring principle for high accuracy applications. An FMCW measurement comprises transmitting into the tank a signal which is swept over a frequency range in the order of a few GHz. For example, the signal can be in the range 25-27 GHz, or 9-10.5 GHz. The transmitted signal is reflected by the surface of the contents in the tank (or by any other impedance transition) and an echo signal, which has been delayed a certain time, is returned to the gauge. The echo signal is mixed with the transmitted signal to generate a mixer signal, having a frequency equal to the frequency change of the transmitted signal that has taken place during the time delay. If a linear sweep is used, this difference frequency, also referred to as an intermediate frequency (IF), is proportional to the distance to the reflecting surface. The mixer signal is often referred to as an IF signal.

More recently, the FMCW principle has been improved, and today typically involves transmitting not a continuous sweep but a signal with stepped frequency with practically constant amplitude. When the transmitted and received signals are mixed, each frequency step will provide one constant piece of a piecewise constant IF signal, thus providing one "sample" of the IF signal. In order to unambiguously determine the frequency of the piecewise constant IF signal, a number of frequencies, N, greater than a number stipulated by the sampling theorem will be required. The distance to the reflecting surface is then determined using the frequency of the IF signal in a similar way as in a conventional FMCW system. Typical values can be 200-300 IF periods at 30 m distance divided in 1000-1500 steps.

It is noted that also a continuous IF signal, resulting from a continuous frequency sweep, may be sampled in order to allow digital processing.

Although highly accurate, conventional FMCW systems (continuous as well as stepped) are relatively power hungry, making them less suitable for applications where power is limited. Examples of such applications include field devices powered by a two-wire interface, such as a 4-20 mA loop, and wireless devices powered by an internal power source (e.g. a battery or a solar cell).

SUMMARY

In view of the above, a general object of the present invention is to provide for more energy-efficient filling level determination using the FMCW measurement principle.

According to a first aspect of the present invention, it is therefore provided a radar level gauge system for determining a filling level of a product in a tank, comprising: a transceiver for generating, transmitting and receiving electromagnetic signals; a signal propagation device coupled to the transceiver for propagating a transmit signal towards a surface of the product, and for propagating a surface echo signal resulting from reflection of the transmit signal at the surface back towards the transceiver; and processing circuitry coupled to the transceiver for determining the filling level based on a relation between the transmit signal and the surface echo signal, the transceiver comprising: PLL circuitry for generating an output signal, the PLL circuitry being configured to indicate a lock state of the PLL circuitry; and frequency modifying circuitry connected to the PLL circuitry for receiving the output signal and for increasing a frequency of the output signal to form the transmit signal, wherein the frequency modifying circuitry is controllable between a first state in which the frequency of the output signal is not increased by the frequency modifying circuitry, and a second state in which the frequency of the output signal is increased by the frequency modifying circuitry, and wherein the frequency modifying circuitry is arranged and configured to receive a PLL status signal indicative of the lock state of the PLL circuitry, and to transition from the first state to the second state in response to the PLL status signal indicating that the PLL circuitry is in a locked state.

According to a second aspect of the present invention, it is provided a radar level gauge system for determining a filling level of a product in a tank, comprising: a transceiver for generating, transmitting and receiving electromagnetic signals; a signal propagation device coupled to the transceiver for propagating a transmit signal towards a surface of the product, and for propagating a surface echo signal resulting from reflection of the transmit signal at the surface back towards the transceiver; and processing circuitry coupled to the transceiver for determining the filling level based on a relation between the transmit signal and the surface echo signal, the transceiver comprising: PLL circuitry for generating an output signal, the PLL circuitry being configured to indicate a lock state of the PLL circuitry; and amplifying circuitry connected to the PLL circuitry for receiving the output signal and for amplifying the output signal to form the transmit signal, wherein the amplifying circuitry is controllable between a low amplification state in which the output signal is amplified by the amplifying circuitry with a first amplification factor, and a high amplification state in which the output signal is amplified by the amplifying circuitry with a second amplification factor being higher than the first amplification factor, and wherein the amplifying circuitry is arranged and configured to receive a PLL status signal indicative of the lock state of the PLL circuitry, and to transition from the low amplification state to the high amplification state in response to the PLL status signal indicating that the PLL circuitry is in a locked state.

According to a third aspect of the present invention, it is provided a method of determining a filling level of a product in a tank using a radar level gauge system comprising PLL circuitry for generating an output signal and signal modifying circuitry connected to the PLL circuitry for receiving the output signal and for modifying at least one property of the output signal for forming a transmit signal, the method comprising the steps of: providing a PLL status signal indicative of a lock state of the PLL circuitry to the signal modifying circuitry; modifying, in response to the PLL status signal indicating that the PLL circuitry is in a locked state, the at least one property of the output signal by the signal modifying circuitry to form the transmit signal; propagating the transmit signal towards a surface of the product; receiving a surface echo signal resulting from reflection of the transmit signal at the surface; and determining the filling level based on a relation between the transmit signal and the surface echo signal.

According to a fourth aspect of the present invention it is provided a radar level gauge system for determining a filling level of a product in a tank, comprising: a transceiver for generating, transmitting and receiving electromagnetic signals; a signal propagation device coupled to the transceiver for propagating a transmit signal towards a surface of the product, and for propagating a surface echo signal resulting from reflection of the transmit signal at the surface back towards the transceiver; and processing circuitry coupled to the transceiver for determining the filling level based on a relation between the transmit signal and the surface echo signal, the transceiver comprising: PLL circuitry for generating an output signal, the PLL circuitry being configured to indicate a lock state of the PLL circuitry; and signal modifying circuitry connected to the PLL circuitry for receiving the output signal and for modifying at least one property of the output signal to form the transmit signal, wherein the signal modifying circuitry is controllable between a first signal modifying state resulting in a first modification of the at least one property of the output signal, and a second signal modifying state resulting in a second modification of the at least one property of the output signal, different from the first modification, and wherein the signal modifying circuitry is arranged and configured to receive a PLL status signal indicative of the lock state of the PLL circuitry, and to transition from the first signal modifying state to the second signal modifying state in response to the PLL status signal indicating that the PLL circuitry is in a locked state.

The PLL (phase lock loop or phase-locked loop) circuitry may be any kind of PLL circuitry capable of indicating a lock state of the PLL circuitry. In particular, the PLL circuitry may be a so-called analog or linear PLL (LPLL), a digital PLL (DPLL), an all digital PLL (ADPLL) or a software PLL (SPLL).

The "lock state" of the PLL circuitry may be selected from the group comprising a locked state and a non-locked state. In its "locked state", the output signal of the PLL circuitry is phase locked relative to an input reference signal to the PLL circuitry, and it its "non-locked state", the output signal of the PLL circuitry is not phase locked relative to the input reference signal.

Most currently commercially available PLL components comprise lock detect circuitry and have an output for providing a signal indicative of the lock state of the PLL. An example of such lock detect circuitry is described in U.S. Pat. No. 5,866,582, which is hereby incorporated by reference in its entirety.

The present invention is based on the realization that energy can be saved in a radar level gauge system using PLL circuitry by making modification of the output signal from the PLL circuitry conditional on the lock state of the PLL circuitry. Before the PLL circuitry is in its locked state, the output signal is generally not useful for filling level measurement. Therefore, energy spent on modifying properties of the output signal to form the transmit signal to be propagated towards the surface of the product is more or less wasted. The present inventors have realized that precious energy can be saved by, for example, increasing the frequency of the output signal and/or amplifying the output signal in response to an indication that the PLL circuitry is in its locked state, in which it can output a sufficiently stable frequency.

In the radar level gauge system according to various embodiments of the present invention, the output signal from the PLL circuitry is passed on to frequency modifying circuitry configured to modify the frequency of the output signal of the PLL circuitry to thereby provide the transmit signal that is propagated towards the surface of the product in the tank using the propagation device. In order to modify the frequency of the output signal from the PLL circuitry, the frequency modifying circuitry needs to be powered and will consume energy.

By configuring the frequency modifying circuitry to receive a PLL status signal indicative of the lock state of the PLL circuitry and to modify the frequency of the output signal in response to the PLL status signal indicating that the PLL circuitry is in a locked state, the time during which the frequency modifying circuitry consumes energy can be reduced, which will reduce the energy consumption of the radar level gauge system.

Additionally, in particular during power up of the PLL circuitry, the frequency of the output signal from the PLL circuitry may vary considerably. By modifying the frequency of the output signal in response to the PLL status signal indicating that the PLL circuitry is its locked state, the risk of emitting RF-energy outside the permitted frequency bands can be reduced.

For example, before a frequency sweep starts, the PLL circuitry may require a certain time period before the frequency of the output signal from the PLL circuitry is stable. The time period before the frequency of the output signal from the PLL circuitry is stable may be in the order of around 0.5 ms, and may depend on various factors, such as the configuration of the PLL circuitry (for instance dimensioning and type of loop filters). During this time period, the PLL circuitry is in its non-locked state, and the output signal from the PLL circuitry may not yet be suitable for use for filling level determination. Through various aspects of the present invention, the frequency modifying circuitry will not modify the frequency of the output signal from the PLL circuitry until the output signal from the PLL circuitry is stable (when the PLL status signal indicates that the PLL circuitry is in its locked state).

The frequency modifying circuitry may comprise at least one frequency multiplier in order to increase the frequency of the output signal from the PLL circuitry to a frequency suitable for the filling level measurement. For instance, the frequency multiplier may be configured to multiply the frequency of the output signal by at least a factor of two.

In some embodiments, the frequency modifying circuitry may comprise summing circuitry configured to add the frequency of the output signal from the PLL circuitry to the frequency of an auxiliary signal. For example, the summing circuitry may be a mixer configured to add the frequency (such as 2-4 GHz) of the output signal from the PLL circuitry to the frequency (such as 22 GHz) output by fixed frequency oscillator.

The various aspects of the present invention are particularly useful during the above-described initiation of the PLL circuitry. Once the frequency sweep has started, and the PLL circuitry is controlled to change the frequency of the output signal in relatively small frequency steps, the PLL circuitry may be required to remain in its locked state. According to various embodiments, however, the PLL circuitry may be allowed to operate in its non-locked state during the frequency sweep. In the latter embodiments, the frequency modifying circuitry may be arranged and configured to start to modify the frequency of the output signal from the PLL circuitry in response to the PLL status signal indicating that the PLL circuitry is in its locked state and then to continue to modify the frequency during the frequency sweep even if there would be a transition of the PLL circuitry to its non-locked state during the frequency sweep.

What has so far been said about the frequency modifying circuitry and its operation may, in various embodiments, also or alternatively apply to controllable amplifying circuitry that may be comprised in the radar level gauge system.

It should be noted that the signal propagation device may be any suitable radiating antenna or transmission line probe. Examples of antennas include a horn antenna, a rod antenna, an array antenna and a parabolic antenna, etc. Examples of transmission line probes include a single line probe (Goubau probe), a twin line probe and a coaxial probe etc.

It should also be noted that the processing circuitry may be provided as one device or several devices working together.

According to various embodiments, the processing circuitry may be configured to determine the filling level based on a phase difference between the transmit signal and the surface echo signal.

According to various embodiments of the present invention, the PLL circuitry may have a first output for providing the output signal and second output for providing a lock state signal indicating the lock state of the PLL circuitry; and the frequency modifying circuitry may have a first input connected to the first output for receiving the output signal and a second input connected to the second output for receiving the lock state signal.

In these embodiments, the lock state signal from the PLL circuitry is provided directly from the PLL circuitry to the frequency modifying circuitry. The lock state signal may, for example, be used for controlling supply of power to the frequency modifying circuitry. This configuration provides for rapid control of the frequency modifying circuitry, so that the measurement can start practically as soon as the PLL circuitry has reached its locked state.

In various embodiments, the PLL status signal may be based on the lock state signal from the PLL circuitry and on a signal from the processing circuitry. Hereby the operation of the frequency modifying circuitry may be controlled based on additional criteria, which provides for increased flexibility.

According to one embodiment, the signal from the processing circuitry may be a PLL enable signal indicating that the PLL circuitry is enabled.

For instance, the frequency modifying circuitry may be controlled to (begin to) modify the frequency of the output signal from the PLL circuitry in response to the lock state signal from the PLL circuitry indicating that the PLL circuitry is in its locked state and the PLL enable signal from the processing circuitry indicating that the PLL circuitry is enabled. In this example, the PLL status signal may correspond to the output signal from an AND-gate with the PLL status signal and the PLL enable signal being the input signals to the AND-gate. This may be useful for PLL components that assign the signal from the lock state signal to indicate "locked state" as the default condition when the PLL circuitry is powered but not in operation. It may also be that the output of the PLL circuitry for providing the lock state signal is used for providing other signals from the PLL circuitry depending on configuration of the PLL circuitry. Also in this case, it may be useful to control the frequency modifying circuitry based on a signal from the PLL circuitry and on a further signal, such as a PLL enable signal from the processing circuitry.

Other logical operations may be used to achieve other results. For example, an OR-operation may be used to allow operation of the PLL circuitry in its non-locked state once initiation has been completed and the frequency sweep has started, as discussed above.

According to various embodiments, furthermore, the PLL circuitry may have a first output for providing the output signal and a second output for providing a lock state signal indicating the lock state of the PLL circuitry; and the frequency modifying circuitry may be connected to the first output of the PLL circuitry for receiving the output signal and the processing circuitry may be connected to the second output of the PLL circuitry for receiving the lock state signal. In these embodiments, the processing circuitry may be configured to generate the PLL status signal based on the lock state signal; and the processing circuitry may be connected to the frequency modifying circuitry for providing the PLL status signal to the frequency modifying circuitry.

According to various embodiments, the radar level gauge system may comprise amplifying circuitry for amplifying the transmit signal. The amplifying circuitry may be arranged and configured to receive the PLL status signal indicative of the lock state of the PLL circuitry, and to amplify the transmit signal in response to the PLL status signal indicating that the PLL circuitry is in the locked state.

Moreover, the radar level gauge system may comprise frequency control circuitry coupled to the PLL circuitry for controlling the PLL circuitry to generate the output signal in the form of a sequence of different frequencies.

The frequency control circuitry may be configured to control the PLL circuitry to generate the output signal in the form of a frequency sweep with a monotonically varying frequency.

The frequency sweep may comprise a plurality of frequency steps.

The frequency control circuitry may be comprised in the processing circuitry. Alternatively, the frequency control circuit may be provided as stand-alone circuitry.

Furthermore, the level gauge system may advantageously further comprise a local energy store for providing electrical energy for operation of said level gauge system. The local energy store may, for example, comprise a battery and/or a super capacitor.

Moreover, the level gauge system may further comprise wireless communication circuitry, such as a radio transceiver, for wireless communication with a remote system.

According to various embodiments, methods according to various aspects of the present invention may comprise the steps of receiving a wake-up signal; and providing, in response to the wake-up signal, a frequency control signal to the PLL circuitry.

The wake-up signal may be provided from a device external to the radar level gauge system, such as a remote control center. Alternatively, the wake-up signal may be generated internally in the radar level gauge system, for example in response to a time-out.

In summary, the present invention thus relates to a radar level gauge system comprising PLL circuitry for generating an output signal. The PLL circuitry is configured to indicate a lock state of the PLL circuitry; and signal modifying circuitry is connected to the PLL circuitry for receiving the output signal and for modifying at least one property of the output signal for forming the transmit signal. The signal modifying circuitry is arranged and configured to receive a PLL status signal indicative of the lock state of the PLL circuitry, and to modify the at least one property of the output signal in response to the PLL status signal indicating that the PLL circuitry is in a locked state.

BRIEF DESCRIPTION OF THE DRAWINGS

These and other aspects of the present invention will now be described in more detail, with reference to the appended drawings showing an exemplary embodiment of the invention, wherein:

FIG. 7 is a diagram showing an exemplary timing for the control of the transceiver in FIG. 3 based on the lock state of the PLL circuit.

DETAILED DESCRIPTION OF EXAMPLE EMBODIMENTS

Figure 1:
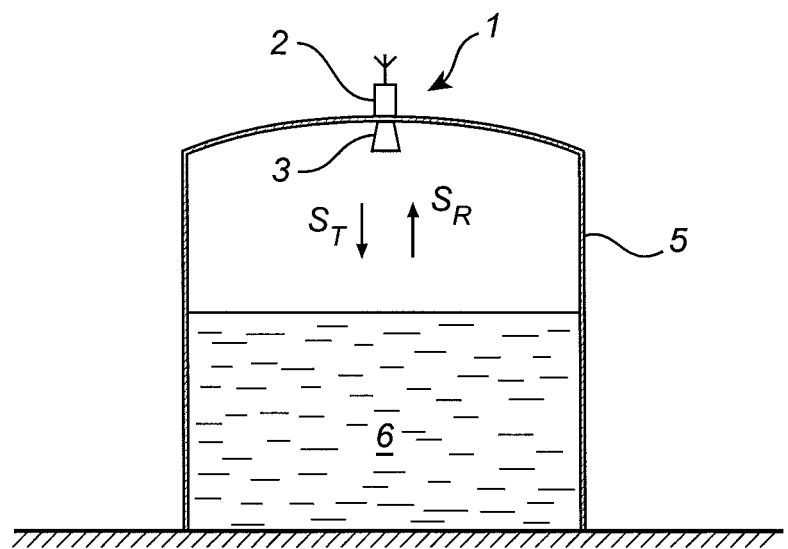
FIG. 1 schematically shows an exemplary tank with an embodiment of the radar level gauge system according to the present invention arranged to determine the filling level of a product in the tank.

FIG. 1 schematically illustrates a radar level gauge system 1 comprising a measurement unit 2 and a signal propagation device, here shown in the form of a horn antenna 3. The radar level gauge system 1 is arranged on top of a tank 5 for determining the filling level of a product 6 in the tank 5.

When measuring the filling level of the product 6 in the tank 5, the radar level gauge system 1 transmits an electromagnetic transmit signal $S_T$ by the horn antenna 3 towards the surface 7 of the product 6, where the signal is reflected as an electromagnetic surface echo signal $S_R$. The distance to the surface 7 of the product 6 is then determined based on the time-of-flight of the electromagnetic surface echo signal $S_R$ (from the radar level gauge system 1 to the surface 7 and back). From the time-of-flight, the distance to the surface, generally referred to as ullage, can be determined. Based on this distance (the ullage) and known dimensions of the tank 5, the filling level can be deduced.

Using the radar level gauge system according to various embodiments of the present invention, the time-of-flight is determined based on the phase difference between the phase-modulated transmit signal and the surface reflection signal. This type of measurement scheme is often referred to as FMCW (Frequency Modulated Continuous Wave).

Figure 2:
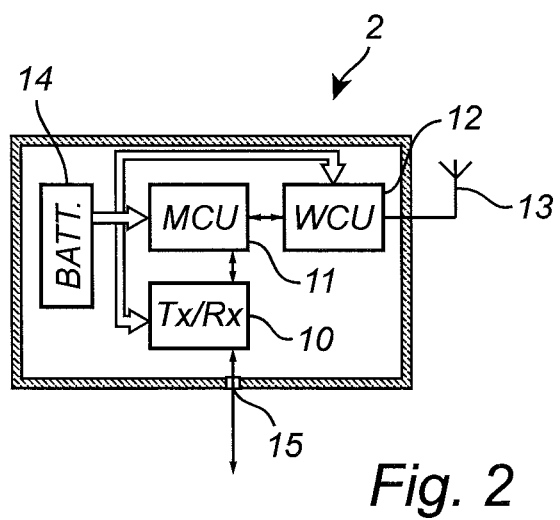
FIG. 2 is schematic illustration of the measurement unit comprised in the radar level gauge system in FIG. 1.

Referring to the schematic block diagram in FIG. 2, the measurement unit 2 of the radar level gauge system 1 in FIG. 1 comprises a transceiver 10, a measurement control unit (MCU) 11, a wireless communication control unit (WCU) 12, a communication antenna 13, an energy store, such as a battery 14, and a tank feed-through 15.

As is schematically illustrated in FIG. 2, the MCU 11 controls the transceiver 10 to generate, transmit and receive electromagnetic signals. The transmitted signals pass through the tank feed-through 15 to the horn antenna 3 (not shown in FIG. 2), and the received signals pass from the horn antenna 3 through the tank feed-through 15 to the transceiver 10.

As was briefly described above with reference to FIG. 1, the MCU 11 determines the filling level of the product 6 in the tank 5 based on the phase difference between the transmit signal $S_T$ and the surface echo signal $S_R$. The filling level is provided to an external device, such as a control center from the MCU 11 via the WCU 12 through the communication antenna 13. The radar level gauge system 1 may advantageously be configured according to the so-called WirelessHART communication protocol (IEC 62591).

Although the measurement unit 2 is shown to comprise an energy store 14 and to comprise devices (such as the WCU 12 and the communication antenna 13) for allowing wireless communication, it should be understood that power supply and communication may be provided in a different way, such as through communication lines (for example 4-20 mA lines).

The local energy store need not only comprise a battery, but may alternatively, or in combination, comprise a capacitor or super-capacitor.

The radar level gauge system 1 in FIG. 1, in particular the transceiver 10, will now be described in greater detail with reference to the schematic block diagram in FIG. 3.

Figure 3:
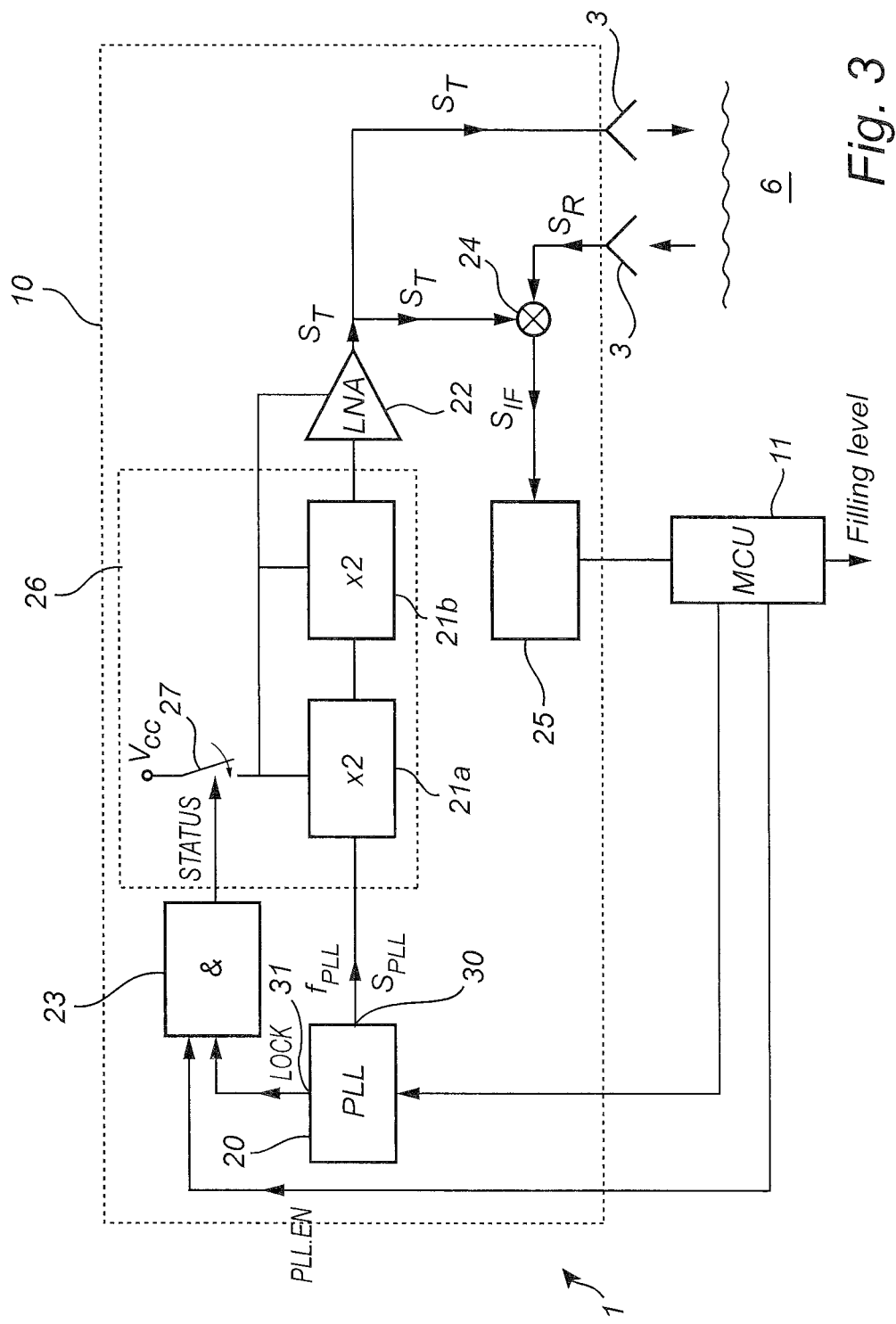
FIG. 3 is a schematic block diagram of a radar level gauge system according to an embodiment of the present invention.

As is schematically illustrated in FIG. 3, the transceiver 10 comprises a PLL (phase-locked loop) circuit 20, frequency modifying circuitry 26, a transmitter amplifier 22, transmitter control circuitry 23, a mixer 24 and measurement circuitry 25. In the example embodiment shown in FIG. 3, the frequency modifying circuitry 26 comprises two frequency multipliers 21a-b and a switch 27 controllable by the transmitter control circuitry 23 to connect the frequency multipliers 21a-b and the transmitter amplifier 22 to a voltage source as is schematically indicated in FIG. 3.

The PLL circuit 20 has a first output 30 for providing a PLL output signal $S_{PLL}$ having an output frequency $f_{PLL}$ and a second output 31 for providing a lock state signal LOCK indicating the lock state of the PLL circuit 20.

The PLL output signal $S_{PLL}$ is passed through the two frequency multipliers 21a-b (in the example illustrated in FIG. 3, the frequency multipliers 21a-b are both frequency doublers) and the transmitter amplifier 22. When the switch 27 is open as shown in FIG. 3, the frequency multipliers 21a-b and the transmitter amplifier 22 will not operate on the PLL output signal $S_{PLL}$.

When the switch 27 is closed, however, the frequency multipliers 21a-b will multiply the frequency of the PLL output signal $S_{PLL}$ and the transmitter amplifier will amplify the signal. The result of these operations is a transmit signal $S_T$ having a transmit frequency $f_T$ that is four times the output frequency $f_{PLL}$ from the PLL circuit 20.

The transmit signal $S_T$ is then propagated towards the product 6 through the antenna 3. The transmit signal $S_T$ hits the surface 7 of the product, where it is reflected as a surface echo signal $S_R$. The surface echo signal returns towards the radar level gauge system and is received by the antenna 3.

As is schematically illustrated in FIG. 3, the surface echo signal $S_R$ and the transmit signal $S_T$ are both provided to the mixer which outputs an intermediate frequency signal $S_{IF}$ having a frequency corresponding to the difference in frequency between the transmit signal $S_T$ and the surface echo signal $S_R$.

The intermediate frequency signal $S_{IF}$ is passed to the measurement circuit 25, which carries out analog signal processing on the intermediate frequency signal $S_{IF}$ and then converts the analog intermediate frequency signal $S_{IF}$ to a digital signal that is provided to the MCU 11. The MCU 11, finally, determines the filling level of the product 6 based on the digitized intermediate frequency signal.

As was briefly mentioned above, the switch 27 is controlled by the transmitter control circuitry 23 which may be implemented as an AND-gate that provides a PLL status signal STATUS to control the switch based on an AND operation on the lock state signal LOCK from the second output 31 of the PLL circuit 20 and a PLL enable signal PLL_EN from the MCU 11. In the embodiment of FIG. 3, power will only be supplied to the frequency multipliers 21a-b and the transmitter amplifier 22 when the PLL circuit 20 is enabled by the MCU 11 and is in its locked state.

The antenna 3 may comprise separate antennas as shown in FIG. 3, or may be a single antenna. In the latter case, the transceiver 10 may additionally comprise circuitry for separating the transmitted and the received signals.

Figure 4:
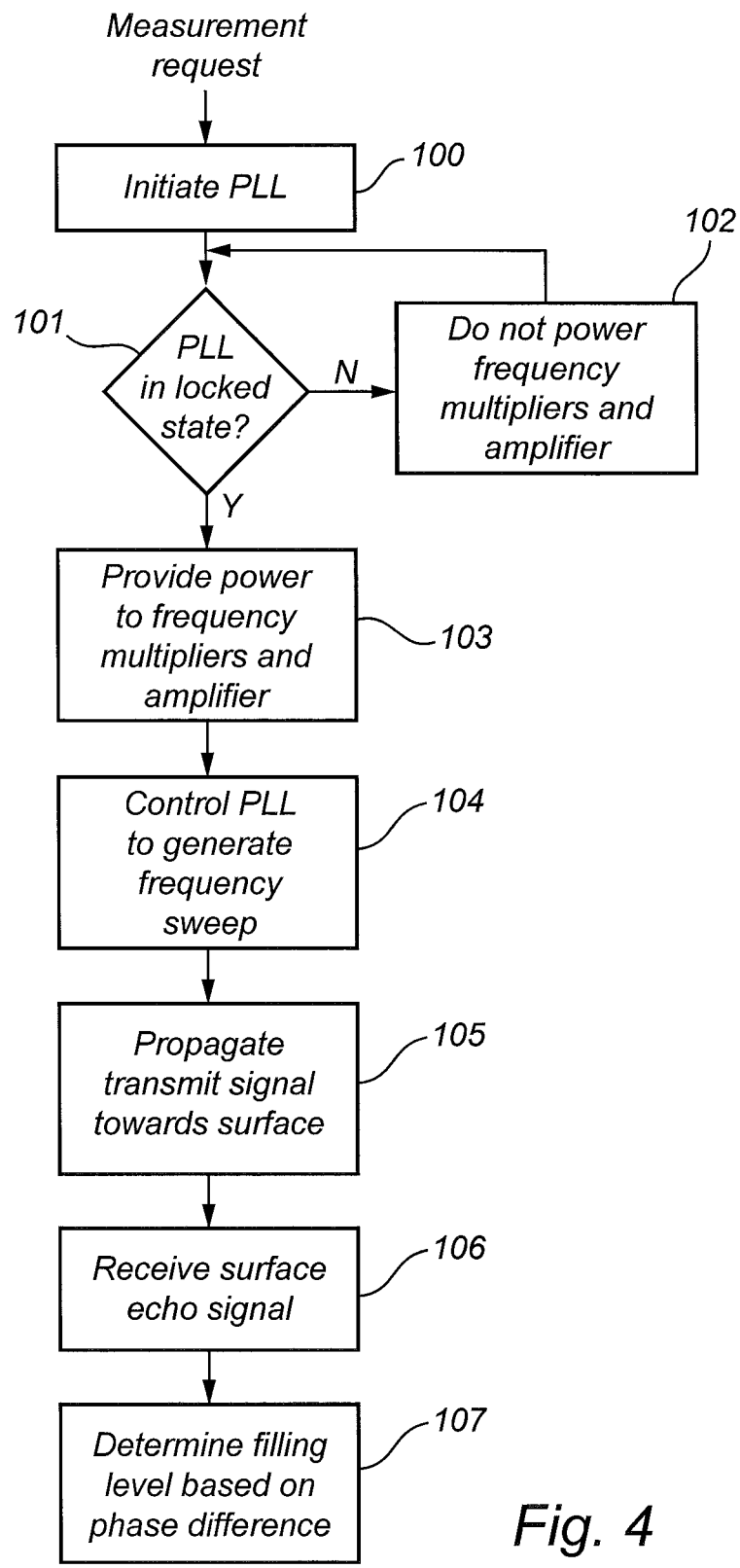
FIG. 4 is a flow-chart outlining an embodiment of the method according to the present invention.

The operation of the radar level gauge system 1 will now be described in greater detail with reference to the flow-chart in FIG. 4, as well as on FIGS. 2, 3, 5, 6 and 7.

In response to receiving a measurement request, which may for example come from the WCU 12 in FIG. 2, the MCU 11 initiates the PLL circuit 20 in a first step 100 by providing power, a PLL enable signal PLL_EN and a signal indicating a desired PLL output frequency $f_{PLL}$ to the PLL circuit 20.

In the subsequent step 101, it is determined if the PLL circuit 20 has locked on the desired output frequency $f_{PLL}$. In other words, it is determined if the PLL circuit 20 is in its locked state or if the PLL circuit 20 is in its non-locked state.

PLL circuits often include circuitry for determining the lock state of the PLL circuit. Such PLL circuits (such as that schematically shown in FIG. 3) may have a dedicated output for providing a lock state signal LOCK indicating whether the PLL circuit 20 is in its locked state or its non-locked state.

If it is determined in step 101 that the PLL is still in its non-locked state, power is not provided to the frequency multipliers 21a-b and the transmitter amplifier 23 (step 102) and the method returns to step 101 and continues to check if the PLL circuit 20 is in its locked state or in its non-locked state.

If it is determined in step 101 that the PLL circuit 20 is in its locked state, the method proceeds to step 103 and power is provided to the frequency multipliers 21a-b and the transmitter amplifier 23.

Figure 5:
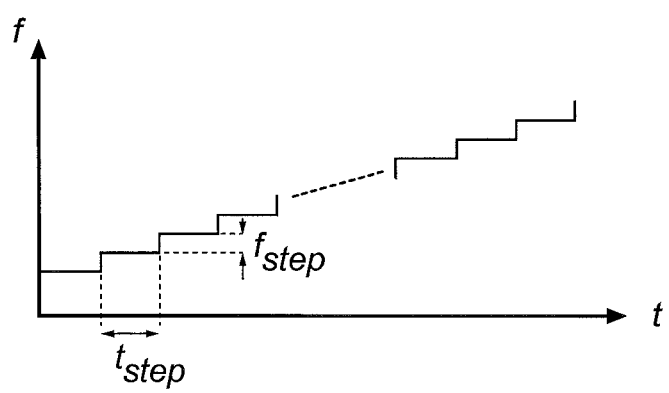
FIG. 5 schematically illustrates an exemplary transmit signal.

When the PLL circuit 20 has been successfully initiated, and power has been provided to the frequency multipliers 21a-b and the transmitter amplifier 23, the MCU 11, in step 104, controls the PLL circuit 20 to provide the PLL output signal $S_{PLL}$ with a time varying output frequency $f_{PLL}$. Following frequency multiplication by the frequency multipliers 21a-b and amplification by the transmitter amplifier 23, this may for example result in the frequency swept transmit signal $S_T$ shown in FIG. 5. FIG. 5 schematically illustrates a part of a stepped frequency sweep where the PLL circuit receives a control signal indicating a certain desired frequency during a step time $t_{step}$, after which the control signal is changed to change the transmit signal by a step frequency $f_{step}$. The step time $t_{step}$ may, for example, be 8 μs, and the step frequency $f_{step}$ may, for example, be 4 MHz.

It should be noted that the transmit signal $S_T$ that is schematically illustrated in FIG. 5 is an idealized signal and that a real signal would typically not perfectly follow the frequency control signal, but there is generally some transient time before the frequency $f_T$ of the transmit signal $S_T$ is stable.

The frequency swept transmit signal $S_T$ (such as the transmit signal $S_T$ shown in FIG. 5) is propagated towards the surface 7 of the product 6 through the antenna 3 in step 105.

A surface echo signal $S_R$ resulting from reflection of the transmit signal $S_T$ at the surface 7 of the product 6 is received in step 106, and, finally, the filling level is determined based on the phase difference between the transmit signal $S_T$ and the surface echo signal $S_R$ in step 107.

When the transmit signal $S_T$ shown in FIG. 5 is transmitted towards the surface 7 of the product 6, the surface echo signal $S_R$ will have a time varying frequency with the same step time $t_{step}$ and step frequency $f_{step}$ as the transmit signal $S_T$ but with a time lag corresponding to the time-of-flight of the surface echo signal $S_R$.

Figure 6:
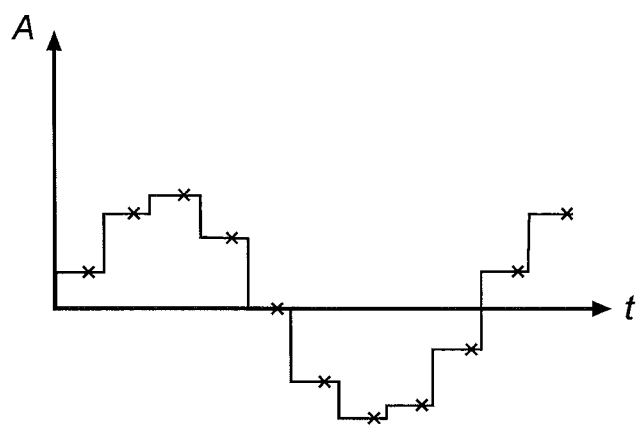
FIG. 6 schematically illustrates an exemplary measurement signal formed based on the transmit signal and the surface echo signal.

Mixing the transmit signal $S_T$ and the surface echo signal $S_R$ will then result in an intermediate frequency signal $S_{IF}$ like that schematically illustrated in FIG. 6.

Following sampling of the intermediate frequency signal $S_{IF}$ at sampling times indicated by 'x' in FIG. 6, the MCU can determine the time-of-flight (and thus the distance to the surface 7 of the product 6) based on the intermediate frequency signal $S_{IF}$.

Finally, an example of a control sequence for controlling power to the frequency multipliers 21a-b and the transmitter amplifier 23 will be described with reference to the diagram in FIG. 7.

Also referring to FIG. 3, the diagram in FIG. 7 includes, from bottom to top, the power supply PWR to the PLL circuit 20, the PLL enable signal PLL_EN from the MCU 11 to the PLL circuit 20, the lock state signal LOCK from the PLL circuit 20 to the transmitter control circuit 23 and the PLL status signal STATUS from the transmitter control circuit 23 to the switch 27.

At the time $t_0$, power to the PLL circuit 20 is switched on. At the time $t_1$, the supply voltage to the PLL circuit 20 is sufficiently high for the PLL circuit 20 to operate. In this particular example, the output 31 for the lock state signal LOCK is also used for one or several other signals depending on how the PLL circuit 20 is configured. In the example illustrated in FIG. 7, the default signal at output 31 is not the lock state signal LOCK, but another signal that is shown to be 'high'.

At the time $t_2$, the PLL circuit 20 has been initiated and configured such that output 31 is used for the lock state signal LOCK. Since the PLL is not in a locked state, the lock state signal is 'low'.

Subsequently, at the time $t_3$, the MCU 11 enables the PLL circuit 20 by changing the PLL enable signal PLL_EN from 'low' to 'high' and provides a frequency control signal corresponding to the first frequency in the frequency sweep to the PLL circuit 20.

At the time $t_4$, the PLL circuit 20 locks at the first frequency and the lock state signal LOCK goes from 'low' to 'high'. Since both the PLL enable signal PLL_EN and the lock state signal LOCK will be 'high', the PLL status signal STATUS will also go 'high' at the time $t_4$ as is indicated in FIG. 7.

When the PLL status signal STATUS goes 'high', power will be supplied to the frequency multipliers 21a-b and the transmitter amplifier 23 (see FIG. 3), and the PLL output signal Spa will be frequency multiplied and amplified to form the transmit signal $S_T$.

At the end of the frequency sweep, the radar level gauge system 1 may be put in an inactive state or (at least partly) shut off in order to save energy. This may be initiated by the MCU 11, as is schematically illustrated in FIG. 7, by switching the PLL enable signal PLL_EN from 'high' to 'low' and turning off power to the PLL circuit 20 at the time $t_5$. Due to the transient behavior when turning off power, the PLL circuit 20 may remain in its locked state until the time $t_6$.

Since the transition of the PLL enable signal PLL_EN from 'high' to 'low' results in the PLL status signal STATUS also going 'low' at the time $t_5$, no signal is, however, radiated by the radar level gauge system 1 after the time $t_5$. This prevents unwanted radiation when turning off power to the PLL circuit 20.

The person skilled in the art realizes that the present invention by no means is limited to the preferred embodiments described above. On the contrary, many modifications and variations are possible within the scope of the appended claims.

What is claimed is:

1. A radar level gauge system for determining a filling level of a product in a tank, comprising:
   a transceiver for generating, transmitting and receiving electromagnetic signals;
   a signal propagation device coupled to the transceiver for propagating a transmit signal towards a surface of said product, and for propagating a surface echo signal resulting from reflection of said transmit signal at said surface back towards said transceiver; and
   processing circuitry coupled to said transceiver for determining said filling level based on a relation between said transmit signal and said surface echo signal,
   said transceiver comprising:
   PLL circuitry for generating an output signal, said PLL circuitry being configured to indicate a lock state of said PLL circuitry; and
   frequency modifying circuitry connected to said PLL circuitry for receiving said output signal and for increasing a frequency of said output signal to form said transmit signal,
   wherein said frequency modifying circuitry is controllable between a first state in which the frequency of said output signal is not increased by said frequency modifying circuitry, and a second state in which the frequency of said output signal is increased by said frequency modifying circuitry, and
   wherein said frequency modifying circuitry is arranged and configured to receive a PLL status signal indicative of said lock state of the PLL circuitry, and to transition from said first state in which the frequency of said output signal is not increased by said frequency modifying circuitry to said second state in which the frequency of said output signal is increased by said frequency modifying circuitry in response to said PLL status signal indicating that said PLL circuitry is in a locked state.

2. The radar level gauge system according to claim 1, wherein said PLL circuitry has a first output for providing said output signal and a second output for providing a lock state signal indicating said lock state of the PLL circuitry; and
   wherein said frequency modifying circuitry has a first input connected to said first output of said PLL circuitry for receiving said output signal and a second input connected to said second output of said PLL circuitry for receiving said lock state signal.

3. The radar level gauge system according to claim 2, wherein said PLL status signal is based on said lock state signal from said PLL circuitry and on a signal from the processing circuitry.

4. The radar level gauge system according to claim 3, wherein said signal from the processing circuitry is a PLL enable signal indicating that the PLL circuitry is enabled.

5. The radar level gauge system according to claim 1, wherein said PLL circuitry has a first output for providing said output signal and a second output for providing a lock state signal indicating said lock state of the PLL circuitry;
   wherein said frequency modifying circuitry is connected to said first output of the PLL circuitry for receiving said output signal and said processing circuitry is connected to said second output of the PLL circuitry for receiving said lock state signal;
   wherein said processing circuitry is configured to generate said PLL status signal based on said lock state signal; and
   wherein said processing circuitry is connected to said frequency modifying circuitry for providing said PLL status signal to said frequency modifying circuitry.

6. The radar level gauge system according to claim 1, wherein said frequency modifying circuitry comprises at least one frequency multiplier.

7. The radar level gauge system according to claim 6, wherein said frequency multiplier is configured to multiply the frequency of said output signal by at least a factor of two.

8. The radar level gauge system according to claim 1, further comprising amplifying circuitry for amplifying said transmit signal,
   said amplifying circuitry being arranged and configured to receive said PLL status signal indicative of said lock state of the PLL circuitry, and to amplify said transmit signal in response to said PLL status signal indicating that said PLL circuitry is in said locked state.

9. The radar level gauge system according to claim 1, wherein said radar level gauge system comprises frequency control circuitry coupled to said PLL circuitry for controlling said PLL circuitry to generate said output signal in the form of a sequence of different frequencies.

10. The radar level gauge system according to claim 9, wherein said frequency control circuitry is configured to control said PLL circuitry to generate said output signal in the form of a frequency sweep with a monotonically varying frequency.

11. The radar level gauge system according to claim 10, wherein said frequency sweep comprises a plurality of frequency steps.

12. The radar level gauge system according to claim 9, wherein said frequency control circuitry is comprised in said processing circuitry.

13. The radar level gauge system according to claim 1, wherein said processing circuitry is configured to determine said filling level based on a phase difference between said transmit signal and said surface echo signal.

14. A radar level gauge system for determining a filling level of a product in a tank, comprising:
   a transceiver for generating, transmitting and receiving electromagnetic signals;
   a signal propagation device coupled to the transceiver for propagating a transmit signal towards a surface of said product, and for propagating a surface echo signal resulting from reflection of said transmit signal at said surface back towards said transceiver; and
   processing circuitry coupled to said transceiver for determining said filling level based on a relation between said transmit signal and said surface echo signal,
   said transceiver comprising:
   PLL circuitry for generating an output signal, said PLL circuitry being configured to indicate a lock state of said PLL circuitry; and
   amplifying circuitry connected to said PLL circuitry for receiving said output signal and for amplifying said output signal to form said transmit signal,
   wherein said amplifying circuitry is controllable between a low amplification state in which said output signal is amplified by said amplifying circuitry with a first amplification factor, and a high amplification state in which said output signal is amplified by said amplifying circuitry with a second amplification factor being higher than said first amplification factor, and
   wherein said amplifying circuitry is arranged and configured to receive a PLL status signal indicative of said lock state of the PLL circuitry, and to transition from said low amplification state in which said output signal is amplified by said amplifying circuitry with a first amplification factor to said high amplification state in which said output signal is amplified by said amplifying circuitry with a second amplification factor being higher than said first amplification factor in response to said PLL status signal indicating that said PLL circuitry is in a locked state.

15. The radar level gauge system according to claim 14, wherein said transceiver further comprises:
frequency modifying circuitry connected to said PLL circuitry for receiving said output signal and for increasing a frequency of said output signal,
wherein said frequency modifying circuitry is controllable between a first state in which the frequency of said output signal is not increased by said frequency modifying circuitry, and a second state in which the frequency of said output signal is increased by said frequency modifying circuitry, and
wherein said frequency modifying circuitry is arranged and configured to receive a PLL status signal indicative of said lock state of the PLL circuitry, and to transition from said first state to said second state in response to said PLL status signal indicating that said PLL circuitry is in said locked state.

16. A method of determining a filling level of a product in a tank using a radar level gauge system comprising PLL circuitry for generating an output signal and signal modifying circuitry connected to said PLL circuitry for receiving said output signal and for modifying at least one property of said output signal for forming a transmit signal, said method comprising the steps of:
providing a PLL status signal indicative of a lock state of said PLL circuitry to said signal modifying circuitry;
modifying, in response to said PLL status signal indicating that said PLL circuitry is in a locked state, said at least one property of said output signal by said signal modifying circuitry to form said transmit signal;
propagating said transmit signal towards a surface of said product;
receiving a surface echo signal resulting from reflection of said transmit signal at said surface; and
determining said filling level based on a relation between said transmit signal and said surface echo signal.

17. The method according to claim 16, wherein said step of modifying comprises the step of:
increasing a frequency of said output signal.

18. The method according to claim 17, wherein the frequency of said output signal is increased by at least a factor of two.

19. The method according to claim 16, wherein said step of modifying comprises the step of:
amplifying said output signal.

20. The method according to claim 16, further comprising the steps of:
receiving a wake-up signal; and
providing, in response to said wake-up signal, a frequency control signal to said PLL circuitry.

21. The method according to claim 16, wherein said filling level is determined based on a phase difference between said transmit signal and said surface echo signal.

* * * * *